US007298246B1

(12) United States Patent
Schmitt

(10) Patent No.: US 7,298,246 B1
(45) Date of Patent: Nov. 20, 2007

(54) VEHICLE SECURITY MONITORING DEVICE

(76) Inventor: William J. Schmitt, 11900 Grason La., Bowie, MD (US) 20715

( * ) Notice: Subject to any disclaimer, the term of this patent is extended or adjusted under 35 U.S.C. 154(b) by 242 days.

(21) Appl. No.: 11/106,746

(22) Filed: Apr. 15, 2005

Related U.S. Application Data

(60) Provisional application No. 60/562,400, filed on Apr. 15, 2004.

(51) Int. Cl.
B60R 25/10 (2006.01)
H04B 1/00 (2006.01)

(52) U.S. Cl. ............... 340/426.1; 340/426.16; 340/426.18; 340/426.27; 340/566; 381/56; 381/86

(58) Field of Classification Search ........... 340/426.1
See application file for complete search history.

(56) References Cited

U.S. PATENT DOCUMENTS

| 5,335,264 A | 8/1994 | Namekawa |
| 5,623,245 A | 4/1997 | Gilmore |
| 5,812,054 A | 9/1998 | Cohen |
| 5,838,227 A | 11/1998 | Murray |
| 6,107,914 A | 8/2000 | Greene |
| 6,259,362 B1 | 7/2001 | Lin |
| 6,337,621 B1 | 1/2002 | Ogino et al. |
| 6,433,683 B1 * | 8/2002 | Robinson .............. 340/540 |
| 6,480,098 B2 | 11/2002 | Flick |
| 6,563,421 B1 * | 5/2003 | Wheeler ............ 340/539.14 |
| 2002/0130765 A1 | 9/2002 | Flick |
| 2003/0016834 A1 * | 1/2003 | Blanco et al. ............. 381/91 |

* cited by examiner

Primary Examiner—Donnie L. Crosland
(74) Attorney, Agent, or Firm—Reed Smith LLP

(57) ABSTRACT

A vehicle security monitoring device monitors sound or movement within a vehicle to determine an abnormal condition such as intrusion of a thief. Upon determination, the device transmits sound picked up within the vehicle to a portable monitor unit carried by the owner of the vehicle using a dedicated link without using any communications network. The transmitted sound allows the owner to distinguish between an actual intrusion and false alarm. Upon verification of an actual intrusion, the portable monitor unit allows the owner to send various instructions to prevent theft of any valuables in the vehicle or theft of the vehicle itself. The instructions may include playing of warning messages, activation of a siren and disabling of the vehicle.

22 Claims, 4 Drawing Sheets

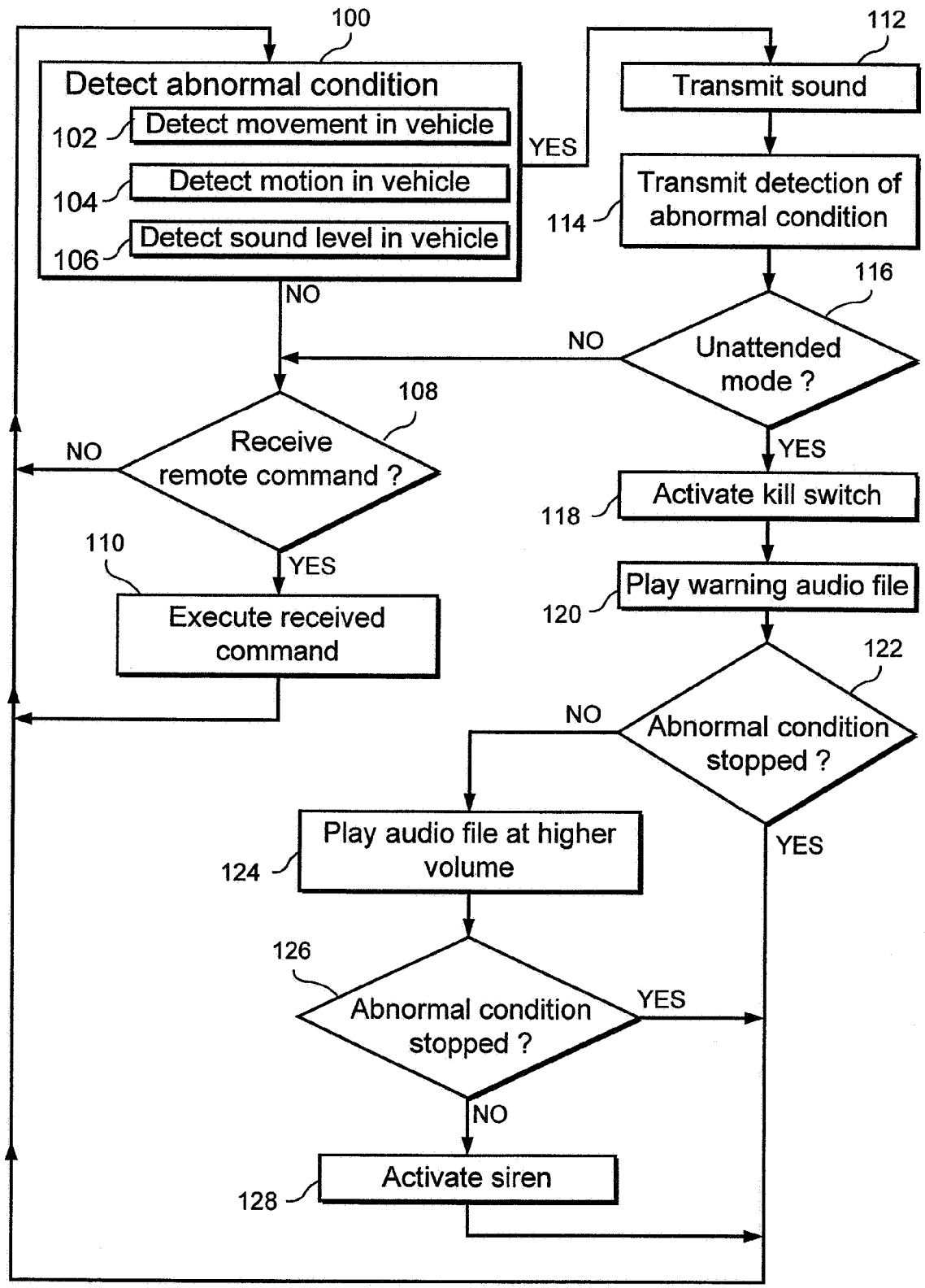
F I G. 3

VEHICLE SECURITY MONITORING DEVICE

CROSS REFERENCE TO RELATED APPLICATIONS

This application claims priority to U.S. provisional application No. 60/562,400, filed Apr. 15, 2004, which is incorporated herein by reference.

TECHNICAL FIELD

The present invention relates to an electronic vehicle security system, and more particularly, a vehicle monitoring device to deter theft of valuables in the vehicle or theft of the vehicle itself.

BACKGROUND OF THE INVENTION

Anti-theft devices which prevent auto theft are conventionally known. A thief may attempt to steal a vehicle or valuables in the vehicle that has been installed with such an anti-theft device by opening a door of the vehicle, opening a trunk, or by breaking a window. Sensors such as motion detectors, vibration detectors, sound detectors, shock sensors, pressure sensors and mechanical switches are used to detect such an intrusion. Upon detection of the intrusion, the anti-theft device actuates a siren and flashes the vehicle headlamps to ward off the thief.

However, the sensors in the anti-theft devices are prone to false actuations. For example, a shock sensor may be actuated by force applied from the outside or a sound sensor may be actuated by excessive external noise without any thief being present. False alarms inconvenience the owner who has to return to the vehicle to turn off the alarm as well as the neighbors who must endure the siren noise until the owner turns off the alarm. On the other hand, when the vehicle is actually being stolen, it may be sometimes dangerous for the owner to approach the vehicle alone. In both cases, the owner will want to ascertain the status of the vehicle before approaching the vehicle.

U.S. Pat. No. 5,335,264 to Namekawa discloses a vehicle security system including a vehicle mounted unit, a vehicle mounted cellular telephone unit and a hand-held remote unit, which is incorporated herein by reference. When the vehicle unit detects an abnormal condition, it sends an alarm signal to the remote unit and turns on the cellular telephone within the vehicle so that it is ready to receive a call, presumably the owner who has received the alarm signal through the remote unit. When the telephone call is received and an "inside sound receiving code" is also received, the vehicle unit connects the cellular telephone's microphone to the transmitter so that the sound within the vehicle can be monitored through the owner's cellular telephone.

However, a problem with the Namekawa system is that it relies on a public cellular telephone network. That means that the system will not operate if either the cellular telephone in the vehicle or the owner's cellular telephone is outside of the telephone service area. Another problem with the Namekawa system is that once intrusion has been detected, no action may be taken if the owner's remote control unit does not receive the indication of intrusion detection. For example, the remote control unit may have been intentionally turned off by the owner or the battery may have died. In that case, there is nothing to prevent the intruder from stealing the vehicle or any component of the vehicle. Moreover, even if the owner verifies an actual intrusion through the sound monitoring, the Namekawa system does not provide any way to prevent the theft.

Therefore, it is desirable to provide improved anti-theft system that does not rely on connection to a telephone network. It is also desirable to provide the system with an ability to prevent the theft once intrusion has been verified.

SUMMARY OF THE DISCLOSURE

According to one aspect of the invention, a vehicle security monitoring device is provided. The device includes a vehicle unit located in a vehicle and a portable monitor unit designed to be carried by an owner of the vehicle. A controller of the vehicle unit is capable of determining an abnormal condition of the vehicle such as an intrusion by a thief. Upon determination of such condition, the controller connects a microphone located in the vehicle to a transceiver to transmit the sound coming from the vehicle. A transceiver of the portable unit is designed to communicate directly with the vehicle unit transceiver without using a communications network to receive the transmitted sound signal. By not relying on any communications network, the vehicle security monitoring device of the present invention can work in areas where there is no public or third party communications network or where the network is down for any reason. Also, the transmitted sound allows the owner to distinguish between an actual intrusion and false alarm.

In another aspect of the invention, the controller in the vehicle unit uses the microphone output to detect the abnormal condition. For example, the abnormal condition may be determined when the level of sound picked up by the microphone increases above a selected threshold level.

In another aspect of the invention, the controller in the vehicle unit uses an output of a movement sensor that detects movement of an object inside the vehicle to detect the abnormal condition. Alternatively, a combination of the microphone output and the movement sensor output can be used to determine the abnormal condition.

In another aspect of the invention, the vehicle unit includes a memory storing an audio data that contains a voice announcement that warns an intruder. Upon determination of the abnormal condition or the vehicle, the controller is capable of playing the stored audio data through a speaker.

In another aspect of the invention, the controller can activate a siren in the vehicle when the sound level from the microphone does not decrease after the stored audio data has been played at least one.

In another aspect of the present invention, the vehicle unit and the portable monitor unit are in regular communication with each other. However, if the vehicle unit loses communication with the portable monitor unit, the vehicle unit can be placed in an unattended mode. The vehicle unit can also be placed into the unattended mode if it receives an instruction from the portable monitoring unit to do so.

In another aspect of the present invention, the portable monitor unit activates a visual or audio alert when the portable monitor unit goes out of communication range with the vehicle unit.

BRIEF DESCRIPTION OF THE DRAWINGS

FIG. 3 illustrates a flowchart of a security monitoring and theft prevention process according to the present invention.

DETAILED DESCRIPTION OF THE INVENTION

The present invention will now be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to similar elements throughout.

Figure 1:
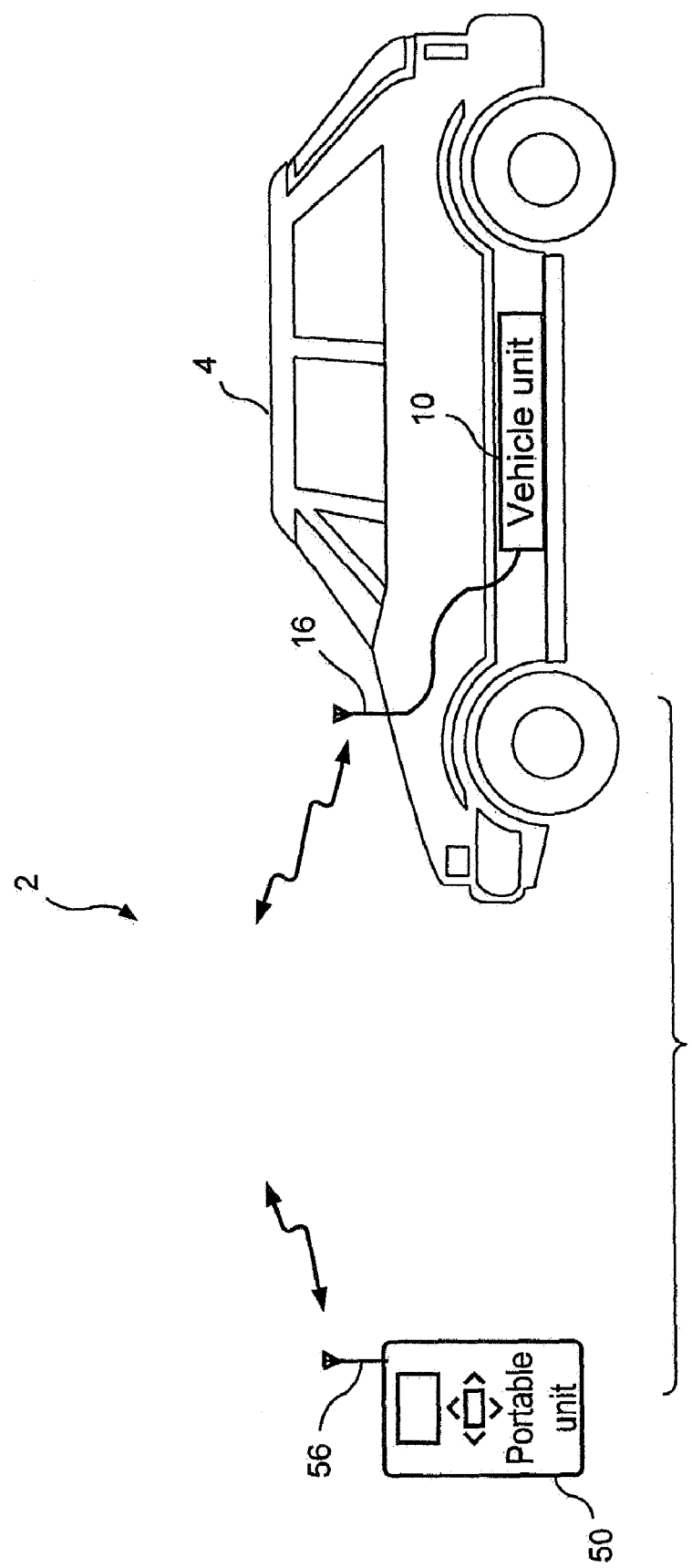
FIG. 1 illustrates a vehicle security monitoring device according to the present invention.

FIG. 1 illustrates a vehicle security monitoring device 2 according to the present invention. The device 2 includes a vehicle unit 10 mounted inside a vehicle 4 and a portable monitor unit 50 to be carried by a vehicle owner that communicates with the vehicle unit. The portable unit 50 is typically powered by a battery (not shown) while the vehicle unit 10 is typically powered from the vehicle's battery although the vehicle unit also has an internal backup battery (not shown) in case power is interrupted.

Figure 2A:
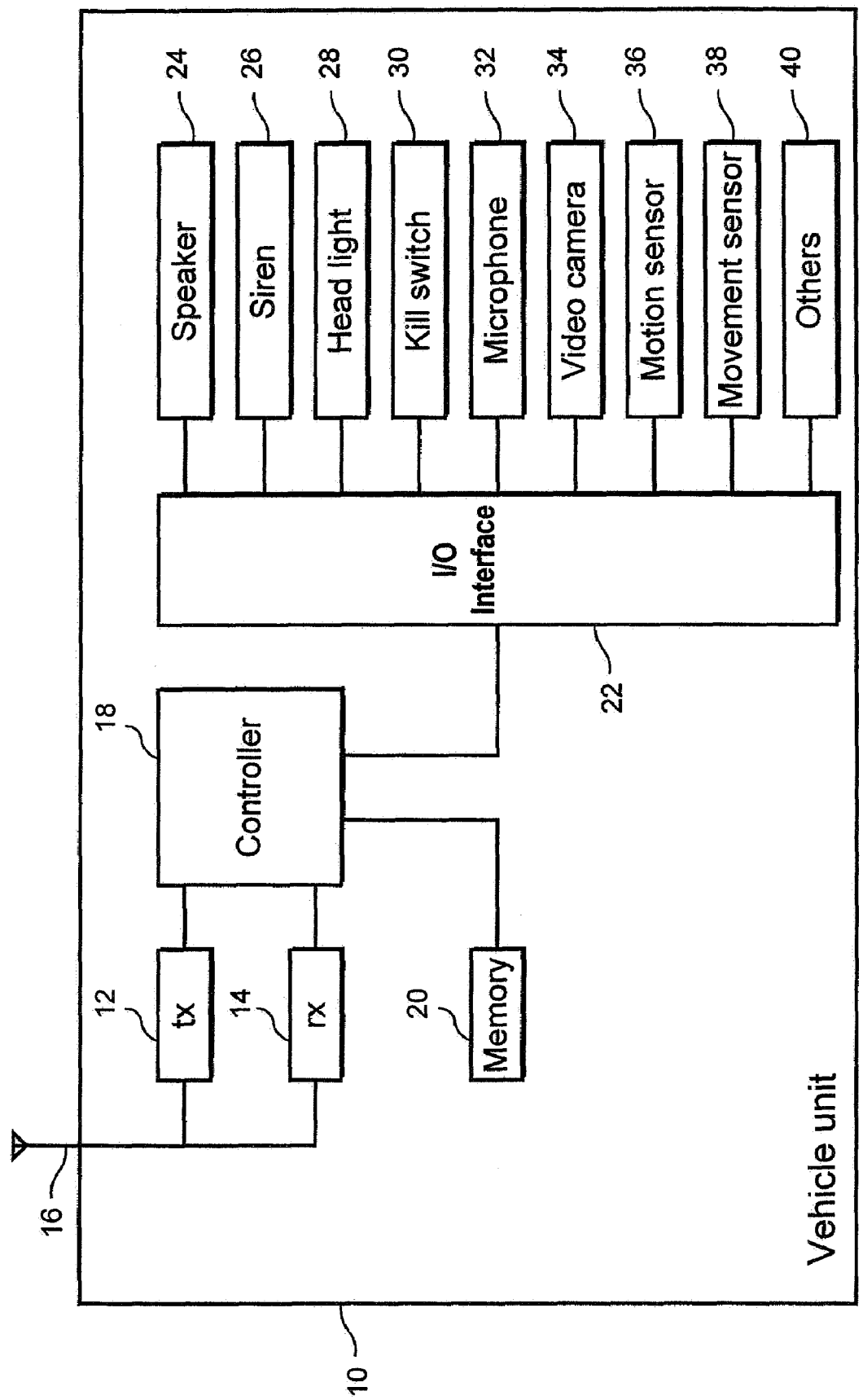
FIG. 2A is a schematic diagram of a vehicle unit according to the present invention.

FIG. 2A is a schematic diagram of the vehicle unit 10 according to the present invention. A transmitter 12 and receiver 14 are both connected to an antenna 16 for direct communication with the portable monitor unit 50. A controller 18, which includes a processor circuit, controls all of the functions of the vehicle unit 10 such as sensor monitoring and detection of any abnormal conditions, communication with the portable monitor unit 50, activation of any alarm conditions and the like. A memory 20 coupled to the controller 18 stores software programs or code to be executed by the controller. The memory 20 also stores digital audio data (stored as a file) that contain voice announcements that warn an intruder. The digital audio files may be in various encoding formats such as "mp3", ".wav" or the like. An I/O interface 22 connected to the controller 18 controls signals coming from the various input devices and signals going to the various output devices. As most of the input and output devices work with analog signals, part of the I/O interface's job is to convert the signals into digital signals that can be worked on by the controller 18. The output devices connected to the I/O interface 22 include a speaker 24 used to play the digital audio files, siren 26 and head lights 28 for alerting the owner and others that the vehicle is being burglarized, and a kill switch 30 to kill the vehicle engine. The input devices connected to the I/O interface 22 include a microphone 32 for picking up sound generated in an area in and near the vehicle, a video camera 34 mounted within the vehicle 4 to pick up images within and near the vehicle, motion sensor 36 to detect movement of the vehicle 4, movement sensor 38 (such as an infrared sensor) that senses any movement of any object within the vehicle, and any other input device 40 such as a door switch that can be used to sense intrusion or unauthorized entry into the vehicle.

Figure 2B:
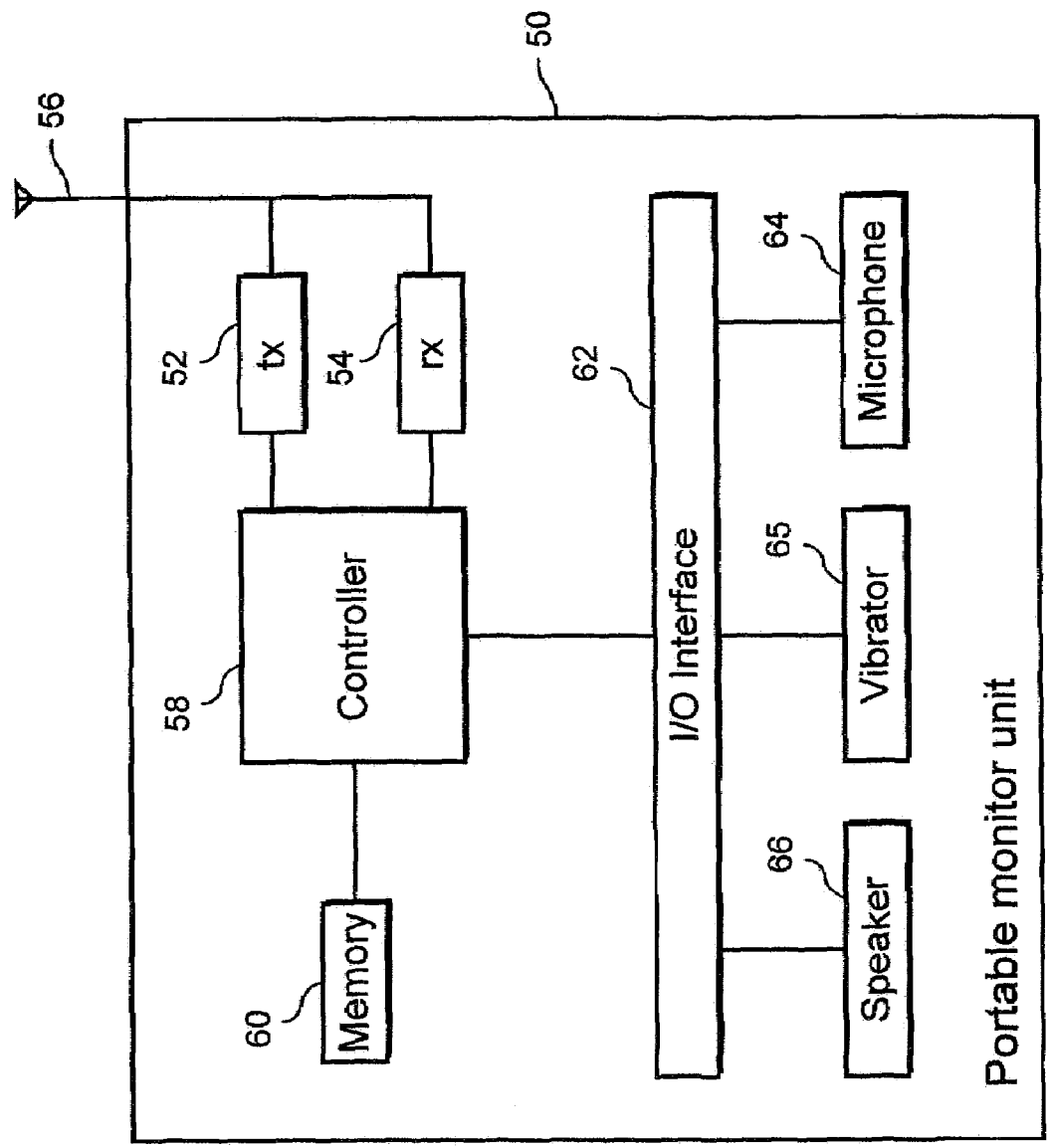
FIG. 2B is a schematic diagram of a portable monitor unit according to the present invention.

FIG. 2B is a schematic diagram of the portable monitor unit 50 according to the present invention. The portable monitor unit 50 is a dedicated unit that is specially designed to work with the vehicle unit 10. "Dedicated" means that the portable unit 50 is adapted to communicate with the vehicle unit 10 without any additional communication unit such as a repeater or telephone switching communications network. A transmitter 52 and receiver 54 are both connected to an antenna 56 for direct communication with the vehicle unit 10. Because the communication link between the vehicle unit and the portable monitor unit 50 is a direct link and the portable monitor unit 50 is a dedicated hardware unit, any communication between the two units does not go through any communications network such as the telephone network. As a result, the vehicle security monitoring device 2 according to the present invention advantageously works in all areas regardless of whether the portable monitor unit or the vehicle 4 is outside of the communications network service area.

A controller 58, which includes a processor circuit, controls all of the functions of the portable monitor unit 50 such as communication with the vehicle unit 50, activation of any intrusion alert devices such as a vibrator 65 or light (not shown). A memory 60 coupled to the controller 58 stores software programs or code to be executed by the controller 58. The memory 60 also is capable of storing video images transmitted from the video camera 34 installed in the vehicle 4. An I/O interface 62 connects a microphone 64, vibrator 65 and speaker 66 to the controller 18. The speaker 66 plays the sound picked up by the microphone 32 and transmitted by the transmitter 12 of the vehicle unit 10. The microphone 64 can be used to pick up the owner's voice to be transmitted to the vehicle unit 50 through the transmitter 52. The receiver 14 in the vehicle unit 10 receives the voice and plays it through the speaker 24. This feature may be more effective in deterring theft because unlike the prerecorded audio messages, the live voice of the owner indicates to the intruder that the owner is aware of the intrusion and that he will actively attempt to interfere with the theft.

The vehicle unit 10 is always in communication with the portable monitor unit 50 to ensure that commands/instructions and alert conditions can be sent to and from each other. For example, in the embodiment shown, a "link-up" feature is implemented wherein the vehicle unit 10 and the portable monitor unit 50 exchanged idle data every 30 seconds. In addition, the vehicle unit 10 transmits a status signal every 5 seconds to which no response is necessary from the portable monitor unit 50. If the portable monitor unit 50 were to lose communication, e.g., if the monitor unit fails to receive either the 5 second signal or the 30 second signal, the controller 58 in the monitor unit 50 is designed to send a beeping sound through the speaker 66. The controller also activates the vibrator 65 connected to the I/O interface 62 to warn the owner that the portable monitor unit 50 has lost communication with the vehicle unit 10. The vibrator 65 may be, for example, a piezoelectric vibrator as is well known in the art.

An operation of the vehicle security monitoring device 2 will now be explained with reference to FIG. 3. FIG. 3 illustrates a flowchart of a security monitoring and theft prevention process stored in the memory 20 and executed by the controller 18. In block 100, which comprises steps 102, 104 and 106, the controller 18 constantly monitors all the input devices to determine whether an abnormal condition has occurred. In step 102, the movement sensor 38 is monitored to see whether there is any movement of any object (especially of a person) inside the vehicle 4. In step 104, the motion sensor 36 is monitored to see whether the vehicle 4 has experienced any movement as in the case of someone entering the vehicle or the vehicle being hit by another vehicle. In step 106, the controller 18 monitors the sound level coming from the microphone 32 to see whether a predetermined sound threshold level has been exceeded. For example, the controller 18 can monitor the highest level of sound or an average sound level picked up by the microphone 32 within a predetermined time period. If any of the three conditions in steps 102-106 is met, then the controller 18 determines that an abnormal condition has been detected.

If the controller 18 determines that no abnormal condition has been detected, then decision block 108 is executed. In block 108, the controller 18 determines whether any remote command instruction from the portable monitor unit 50 has been received through the receiver 14. If yes, block 110 executes the received command and returns to block 100. The instructions from the portable monitor unit 50 includes "activate/deactivate unattended mode", "start/stop playing audio file", "activate/deactivate kill switch", "activate/deactivate siren", "activate/deactivate video camera", and "reset abnormal condition" among others.

If the controller 18 determines that an abnormal condition has been detected in block 100, then control passes to block 112. In block 112, the controller 18 automatically connects the microphone 32 to the transmitter 12 to continuously transmit a sound signal containing the sound coming from within the vehicle 4. If a video camera 34 has been installed, it is also automatically connected to the transmitter to transmit a video signal containing images of the vehicle inside. The video images may assist the owner in determining an actual intrusion from a false alarm. They may also assist law enforcement officers in ascertaining the identity of the intruder assuming that the images are recorded by the portable monitor unit 50.

In block 114, the controller 18 transmits a status signal that indicates detection of the abnormal condition so that the portable monitor unit 50 could alert the owner appropriately. When the controller 58 in the monitor unit 50 receives the status signal, it briefly sends a distinct beeping sound through the speaker 66 and/or activates the vibrator 65 to alert the owner.

In decision block 116, the controller 18 determines whether the vehicle unit 10 is in an attended mode or unattended mode. In the embodiment shown, the vehicle unit 10 can be placed in the unattended mode in several different ways. In one way, the owner of the vehicle 4 can manually send an "activate unattended mode" instruction through the portable monitor unit 50. In another way, if the vehicle unit 10 loses communication with the portable monitor unit 50, the controller 18 automatically places the vehicle unit 10 into the unattended mode.

If determined to be in the attended mode, the controller 18 executes block 108. As described above, in blocks 108-110, the controller 18 executes any remote command instructions received from the portable monitor unit 50 an returns to block 100.

Although not shown in FIG. 3, in case the vehicle unit 10 is in the attended mode, but has not received any instruction from the portable unit 50 for a predetermined time period (e.g., 30 seconds) after the abnormal condition detection signal in block 114 has been sent, the vehicle unit 10 automatically goes into the unattended mode regardless of whether the vehicle unit is in communication with the portable unit 50.

In decision block 116, if the vehicle unit 10 is determined to be in the unattended mode, block 118 is executed. In block 118, the contoller 18 activates the kill switch 30 to disable the vehicle 4. In block 120, the controller 18 retrieves a selected digital audio file stored in the memory 20 and the retrieved audio file is played through the speaker 24 at a selected volume. The stored digital audio file is typically an encoded ".wav" or ".mp3" file or the like, and contains a voice announcement that warns intruder to leave the vehicle 4. After the file is played, the controller 18 in block 122 determines whether the abnormal condition has stopped. For example, the controller monitors the movement sensor 38 to see if the movement has stopped or monitors the sound level of the microphone 32 to see if the level has decreased below a predetermined level.

If the abnormal condition still persists, then the controller 18 executes block 124. In block 124, the digital audio file is played through the speaker 24 at a higher volume that at block 120. In block 126, the controller again determines whether the abnormal condition has stopped. If the abnormal condition still persists, then the controller 18 executes block 128. In block 128, the controller 18 activates the siren 26 in an attempt to scare away the intruder from the vehicle 4.

Advantageously, the vehicle unit 10 communicates directly with the portable unit 50 without using any repeater or telephone network to ensure that the system will continue to operate without relying on the communications network. Once intrusion has been detected, the present system allows the owner to remotely send instructions to the vehicle unit such as activating a warning message, siren and kill switch, to prevent theft of the vehicle or loss of valuables in the vehicle. Even if the owner is not in a position to remotely respond through the portable monitor unit 50, the vehicle is smart enough to automatically place itself into an unattended mode to automatically execute theft prevention steps of 118-128.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A vehicle security monitoring device comprising:
a vehicle unit located in a vehicle and including:
a first transceiver;
a microphone operable to pick up sound coming from the vehicle;
a controller coupled to the first transceiver and the microphone, and operable to determine an abnormal condition of the vehicle, the controller further operable to automatically connect the microphone to the first transceiver to transmit a sound signal containing the sound coming from the vehicle upon determination of the abnormal condition;
a portable monitor unit including a second transceiver adapted to directly communicate with the first transceiver of the vehicle unit without using a communications network, wherein the second transceiver directly receives the transmitted sound signal from the vehicle unit without the transmitted sound signal being routed through the communications network.

2. The vehicle security monitoring system according to claim 1, wherein the controller determines the abnormal condition based on an output of the microphone.

3. The vehicle security monitoring system according to claim 1, wherein the controller determines the abnormal condition based on whether the level of sound picked up by the microphone increases above a selected threshold level.

4. The vehicle security monitoring system according to claim 1, further comprising a movement sensor that detects movement of an object inside the vehicle, the controller determining the abnormal condition based on an output of the movement sensor.

5. The vehicle security monitoring system according to claim 1, further comprising a movement sensor that detects movement of an object inside the vehicle, the controller determining the abnormal condition based on both an output of the movement sensor and an output of the microphone.

6. The vehicle security monitoring system according to claim 1, wherein:
the vehicle unit further includes a memory coupled to the controller and storing an audio data that contains a voice announcement that warns an intruder; and
the controller plays the stored audio data through a speaker upon determination of the abnormal condition.

7. The vehicle security monitoring system according to claim 6, wherein the controller replays the stored audio data at a higher volume when the sound level from the microphone does not decrease after the stored audio data has been played at least once.

8. The vehicle security monitoring system according to claim 6, wherein the controller activates a siren in the vehicle when the sound level from the microphone does not decrease after the stored audio data has been played at least one.

9. The vehicle security monitoring system according to claim 1, further comprising a video camera connected to the controller, the controller operable to transmit through the first transceiver a video signal containing images within the vehicle to the portable monitoring unit in response to determination of the abnormal condition.

10. The vehicle security monitoring system according to claim 1, wherein the controller places the vehicle unit in an unattended mode if communication is lost with the portable monitor unit or the controller receives an instruction from the portable monitoring unit instructing the vehicle unit to enter the unattended mode.

11. The vehicle security monitoring system according to claim 10, wherein:
the vehicle unit further includes a memory coupled to the controller and storing an audio data that contains a voice announcement that warns an intruder; and
the controller plays the stored audio data through a speaker upon receiving an instruction from the portable monitoring unit instructing the vehicle unit to play the stored audio data.

12. The vehicle security monitoring system according to claim 10, wherein in the unattended mode, the controller automatically activates a siren after the abnormal condition has been determined.

13. The vehicle security monitoring system according to claim 1, wherein the portable monitor unit activates a visual or audio alert when the portable monitor unit goes out of communication range with the vehicle unit.

14. The vehicle security monitoring system according to claim 1, wherein:
the vehicle unit is connected to a speaker;
the portable monitor unit includes a microphone adapted to output a user sound signal containing the sound of a user to be transmitted through the second transceiver, wherein the controller receives the transmitted user sound signal for play back through the speaker.

15. The vehicle security monitoring system according to claim 1, wherein the controller determines the abnormal condition based on an output of the microphone.

16. The vehicle security monitoring system according to claim 1, wherein the controller determines the abnormal condition based on whether the level of sound picked up by the microphone increases above a selected threshold level.

17. The vehicle security monitoring system according to claim 1, further comprising a movement sensor that detects movement of an object inside the vehicle, the controller determining the abnormal condition based on an output of the movement sensor.

18. The vehicle security monitoring system according to claim 1, further comprising a movement sensor that detects movement of an object inside the vehicle, the controller determining the abnormal condition based on both an output of the movement sensor and an output of the microphone.

19. The vehicle security monitoring system according to claim 1, wherein the controller activates a siren in the vehicle when the sound level from the microphone does not decrease after the stored audio data has been played at least one.

20. The vehicle security monitoring system according to claim 1, wherein the controller places the vehicle unit in an unattended mode if communication is lost with the portable monitor unit or the controller receives an instruction from the portable monitoring unit instructing the vehicle unit to enter the unattended mode.

21. A vehicle security monitoring device comprising:
a vehicle unit located in a vehicle and including:
a first transceiver;
a microphone operable to pick up sound coming from the vehicle;
a memory storing an audio data containing a voice announcement that warns an intruder; and
a controller coupled to the first transceiver, the microphone and the memory, and operable to determine an abnormal condition of the vehicle, the controller further operable to:
automatically connect the microphone to the first transceiver to transmit a sound signal containing the sound coming from the vehicle upon determination of the abnormal condition; and
play the stored audio data through a speaker upon determination of the abnormal condition;
a portable monitor unit including a second transceiver adapted to directly communicate with the first transceiver of the vehicle unit without using a communications network.

22. The vehicle security monitoring system according to claim 21, wherein the portable monitor unit includes a microphone adapted to output a user sound signal containing the sound of a user to be transmitted through the second transceiver, wherein the controller receives the transmitted user sound signal for play back through the speaker.

* * * * *